US005547360A

United States Patent [19]

Yokoyama

[11] Patent Number: 5,547,360

[45] Date of Patent: Aug. 20, 1996

[54] POWDER MOLDING PRESS

[75] Inventor: Tatsuichi Yokoyama, Nagaoka, Japan

[73] Assignee: Tamagawa Machinery Co., Ltd., Tokyo, Japan

[21] Appl. No.: 210,008

[22] Filed: Mar. 17, 1994

[51] Int. Cl.[6] .............................. B29C 43/58; B30B 11/02

[52] U.S. Cl. ............................ 425/149; 425/150; 425/352

[58] Field of Search ..................................... 425/149, 150, 425/352

[56] References Cited

U.S. PATENT DOCUMENTS

| | | | |
|---|---|---|---|
| 2,334,082 | 11/1943 | Gates | 425/149 |
| 3,559,247 | 2/1971 | Larsson | 425/149 |
| 3,907,474 | 9/1975 | Blaser et al. | 425/149 |
| 4,363,612 | 12/1982 | Walchhutter | 425/149 |
| 4,718,842 | 1/1988 | Labbe et al. | 425/149 |
| 5,288,440 | 2/1994 | Katagiri et al. | 425/149 |

*Primary Examiner*—James P. Mackey
*Attorney, Agent, or Firm*—Lackenbach Siegel Marzullo Aronson & Greenspan, P.C.

[57] ABSTRACT

The powder molding press reduces manufacturing and running costs by enabling rams to be driven with the necessary pressing force and ram speed despite small motor capacity. The molding press is provided with an encoder for detecting the rotating angle of a main shaft driving an upper ram, a control device for computing the quantities to be controlled of a lower ram against the detected rotational angle of the main saft, and for determining movements of the lower ram by applying data obtained from the computed results, and a motor for driving the lower ram under the control of the control device, and converting the rotational force of the motor to a compressive force and ram-driving speed suited for the molding press as well as for transmitting the force and speed to the lower ram.

4 Claims, 5 Drawing Sheets

POWDER MOLDING PRESS

BACKGROUND OF THE INVENTION

This invention relates to a powder molding press and controlling the to action of a lower ram in accordance with the movement of an upper ram.

FIG. 7 is a working characteristic diagram showing movements of a punch and die of a conventional molding press. In order from the top, stroke diagrams of the upper and lower rams, a pressurizing diagram of the upper punch, a velocity diagram of dies, and a working force diagram acting on the dies are shown. The movements of the upper punch and die in one working cycle are shown in FIG. 7. In the present invention, on the other hand, a motor driving the dies keeps constant torque regardless of its speed, accordingly, in selecting the motor capacity, it is necessary to satisfy the maximum speed for driving rams, and also to satisfy the maximum output force. With respect to the general motor characteristic on the relation between the force and speed affecting the dies, the speed is fast and the pressing force is small at the compression starting point, and in accordance with the progress of the compression stroke, the pressing force gradually grows larger and the compressive speed conversely becomes smaller.

With smaller force, the speed becomes faster, and with a larger force the speed tends to be slower, so in order to obtain both a larger force and higher speed, it is necessary to increase motor capacity, which entails higher production and operating costs.

The present invention was developed in consideration of the above-mentioned problems, and its object is to provide a powder molding press able to obtain sufficient compressive force and working speed even if provided with small motor capacity, by installing a pair of non-circular gears able to mechanically change the speed ratio between the motor and the lower ram for pressing dies.

SUMMARY OF THE INVENTION

The powder molding press according to the present invention is provided with a first ram or encoder which detects the rotational angle of a main shaft driving a first ram or upper ram, a control device which computes the quantity of a second ram or lower ram controlled corresponding to the detected rotational angles of the main shaft, and determines the required movement of the lower ram by applying data obtained from the computed results, and a motor for driving the lower ram under direction of the control device. It is constructed to transmit the rotational force of the motor converted to the preferred force and velocity to the lower ram for performing efficient pressing work by applying a pair of non-circular gears.

The control device divides the profile of the upper ram by a crank rotating angle $\Delta Q$, then converts the moving amounts of the upper ram in the region of each crank rotating angle $\Delta Q$ to numerical values, and then prepares the working profile of the lower ram during the compression process, by computing the relations between the numerical values and the speed-ratio-parameter of the lower ram input arbitrarily by the operator, further letting the lower ram together with the crank mechanism to move with the pressing force and speed compatible for the object of the press, by applying a pair of non-circular gears shaped so as to be able to obtain the predetermined working profile of the lower ram.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

A preferred embodiment according to the present invention is described in detail with reference to the accompanying drawings as follows.

Figure 1:
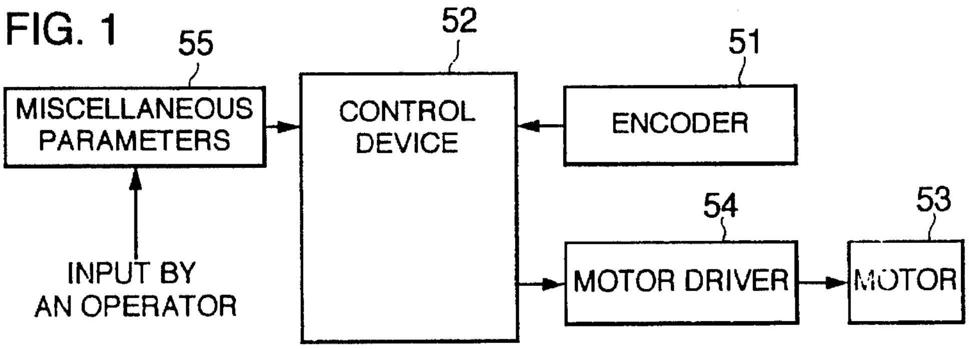
FIG. 1 shows a block diagram of a powder molding press made according to an embodiment of the present invention.

FIG. 1 is a block diagram of the control device of the powder molding press made according to the present invention. In this Fig., numeral 51 is a rotary encoder which detects the rotating angle of the main shaft driving the upper ram, numeral 52 is a control device which computes the portion of the lower ram according to the detected rotational angle, and determines the movement of the lower ram according to the computed result, numeral 53 is a servomotor which drives the lower ram under the control of the control device, numeral 54 is a motor which drives the servomotor 53, and numeral 55 represents miscellaneous parameters input into the control device by an operator. The above-mentioned control device 52 is further provided with an I/O port of the data, computing and memorizing regions.

Figure 2:
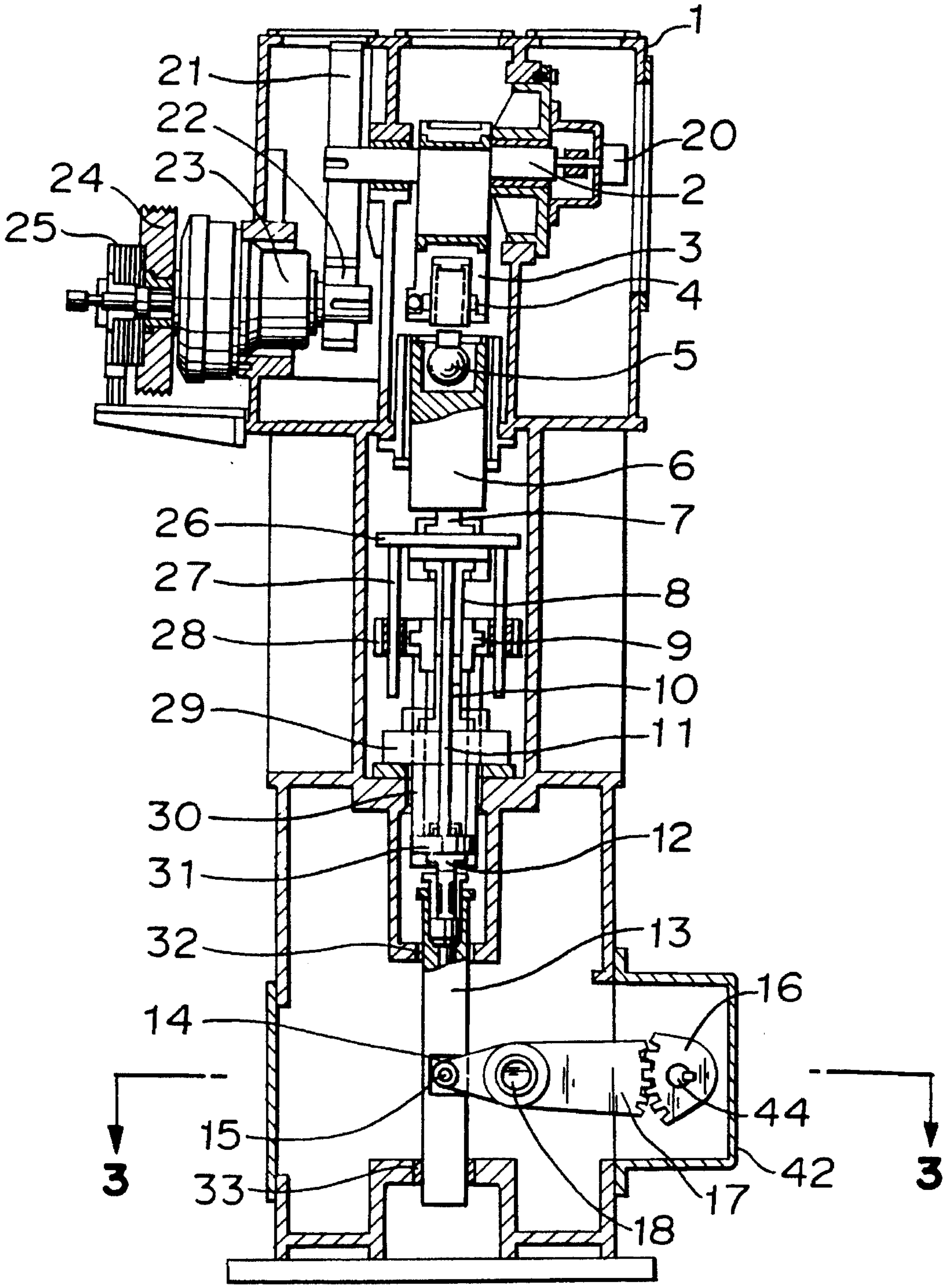
FIG. 2 shows a sectional view of the mechanical construction of the powder molding press according to the present invention.

FIG. 2 shows a mechanical construction of the powder molding press, which includes a frame 1, a main shaft 2 supported in this frame together with a crank mechanism, a connecting rod 3 connected to the main shaft, an upper punch adjust nut 4, a pitman screw 5 connected to the nut 4, an upper ram 6, and an upper T-shaped joint 7 connected to the upper ram 6 are shown.

Figure 3:
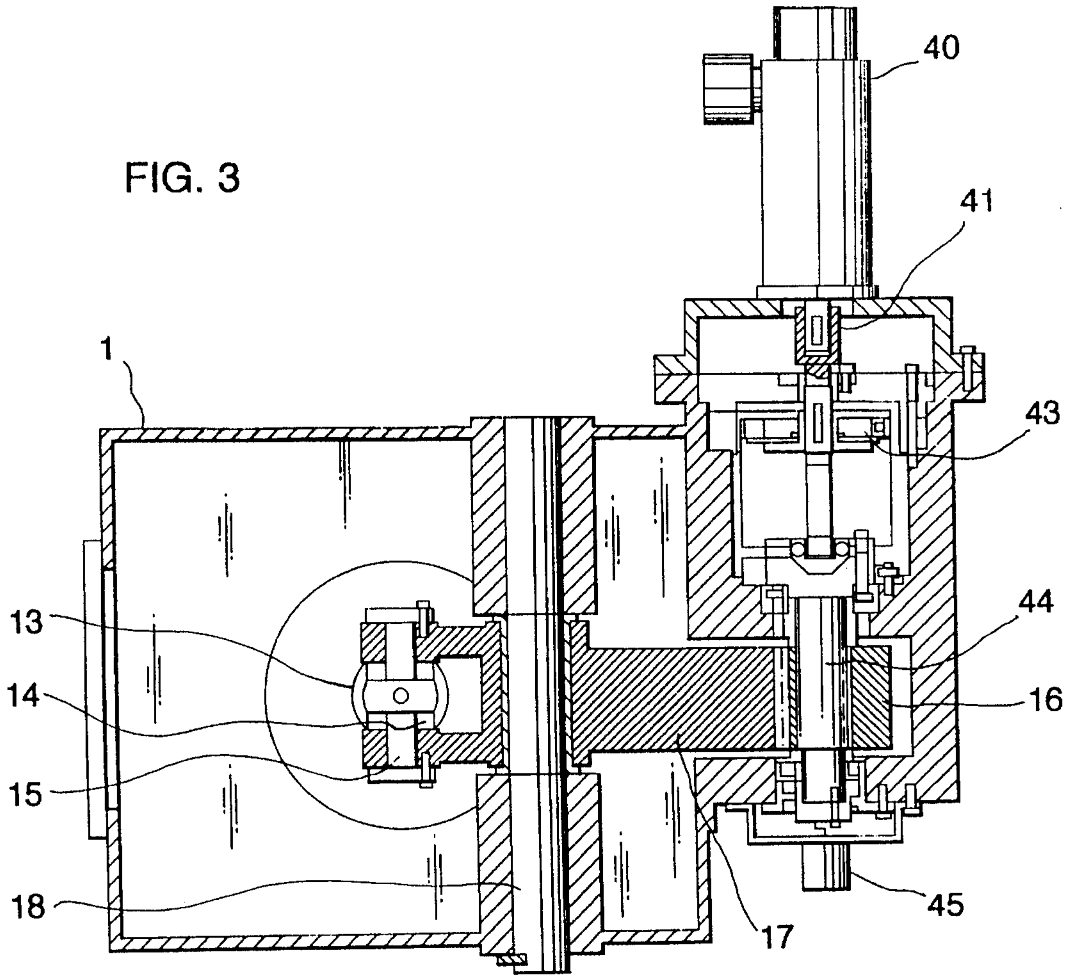
FIG. 3 shows a sectional view along line 3—3 in FIG. 2.

Arranged in frame 1 are an upper punch 8 installed in an upper punch plate 26 integrated in one piece with the upper T-shaped joint 7, an upper punch guide rods 27 connected to the upper punch plate 26 and guided by a die plate 28, a die 9, a lower punch 10, a core rod 11, a lower T-shaped joint 12 connected to the core rod 11 through a drawing plate 31, a lower ram 13 connected to the bottom portion of the lower T-shaped joint 12, a pressure steed 14 connected to the middle portion of the lower ram 13, a support pin 15 supporting the steed 14 on the end portions of a swinging lever 17, a support pin 18 swingably supporting the swinging lever 17, and a non-circular gear 16 engaging with the gear shaped on the end portion of the swinging lever 17. The non-circular gear 16 is installed on an output shaft 44 in a case 42 as shown in FIG. 3. In FIG. 3, numeral 43 is a speed reducer connecting the output shaft 44 to the input shaft of the servomotor 41, and numeral 45 is a rotary encoder detecting the revolution of the output shaft 44.

Returning to FIG. 2, numeral 20 is another rotary encoder which detects the revolution of the main shaft 2, numeral 21 is a main gear installed on the end portion of the main shaft 2, numeral 22 is a pinion gear engaged with the main gear 21, numeral 23 is a speed reducer, numeral 24 is a fly wheel, numeral 25 is a clutch-braking mechanism, numeral 29 is a fixed punching plate, numeral 30 are a pair of tie rods, and numerals 32 and 33 are guide bushings for the lower ram 13.

The action of this powder molding press is described as follows. First, the external power source (not shown) in FIG. 2 transmits the rotation to the main shaft 2 through the clutch-braking mechanism 25, the fly wheel 24, the speed reducer 23, the pinion gear 22, and the main gear 21. The rotating angle of the main shaft 2 is detected by the rotary encoder 20 (equivalent to the encoder 51 shown in FIG. 1), and the encoded angle is input in the control device 52. The detected data correspond to the movement of the upper ram. The upper ram 6 is driven upwards and downwards through the action of the main shaft 2, the connecting rod 3 and the pitman screw 5.

On the other hand, as shown in FIG. 3, the lower ram 13 moves upwards and downwards through the action of the input shaft 41, the speed reducer 43, the output shaft 44, the non-circular gear 16 and the swinging lever 17 driving servomotor 40. According to these motions, the powder is compressed.

Figure 7:
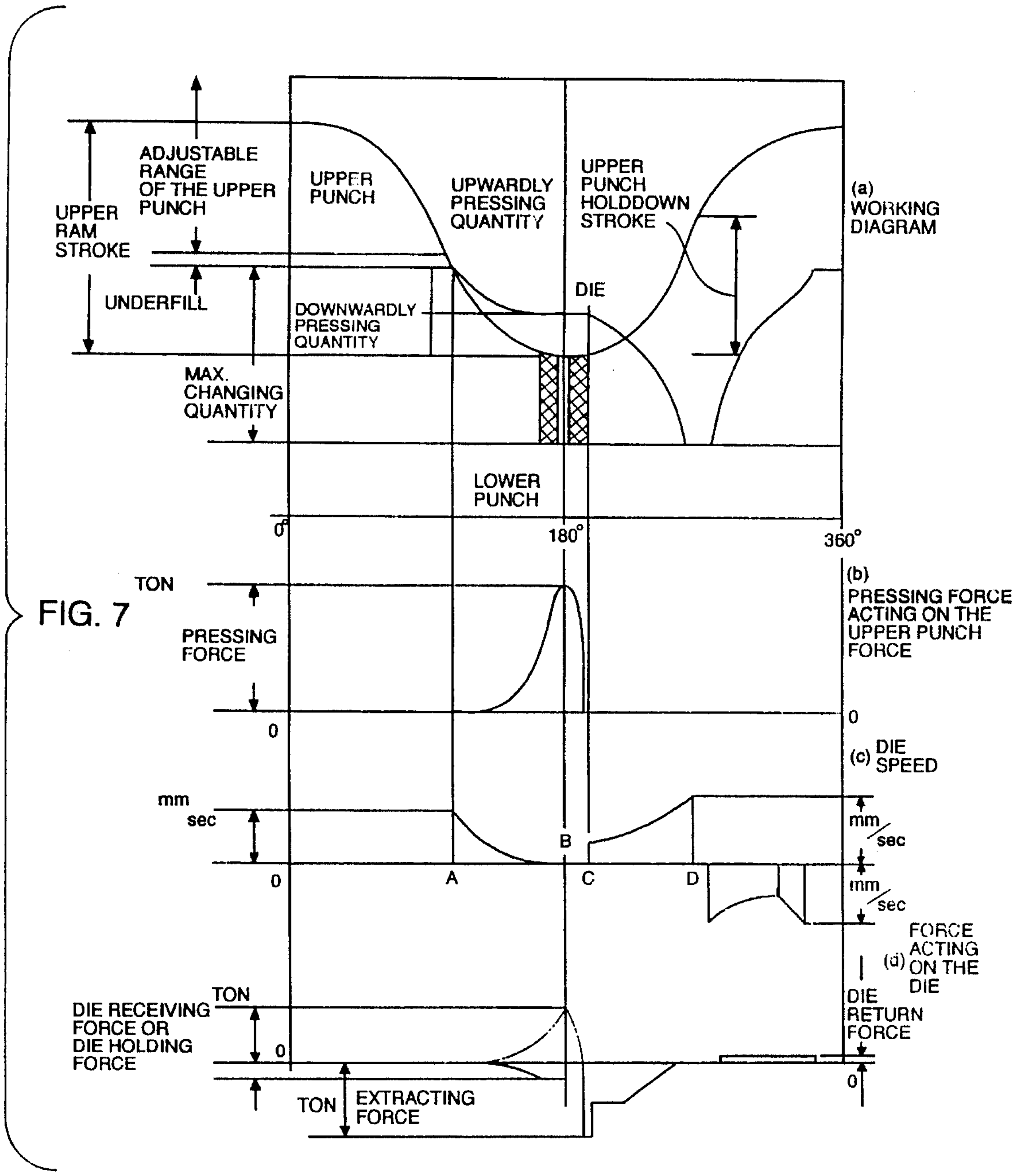
FIG. 7 shows working diagrams relative to the movement of the punch and dies in the powder molding press.

As shown in FIG. 7, with respect to the relation between the force acting on the dies and the working speed, the pressing force may be smaller when the die speed is faster, but must be larger if the die speed is slower. Accordingly, if the above non-circular gear 16 enabling mechanical change of the speed ratio is installed between the servomotor 40 and the lower ram 13, it is understood that the servomotor capacity can be reduced to one of a small capacity.

For example, when molding any molded product, if setting up the motor capacity letting dies downwardly move, to W(kw), the motor maximum revolution to N rpm, and adopting the speed reducer having a reduction ratio $\epsilon$, the compression force becomes 0 tons and the processing speed becomes Vc at the compression starting point A, and the force and speed become respectively P tons and 0 at the compression end point B as shown in FIG. 7.

In this case, if installing the non-circular gear 16 which is able to change the speed ratio between $0.8\epsilon$ and $1.2\epsilon$, and letting the speed ratio be $0.8\epsilon$ at point A requiring high speed and small force, and conversely letting the speed ratio be $1.2\epsilon$ at the point B requiring larger force and low speed, the generated force becomes $P\times(1.2/0.8)^2=2.25P$, namely 2.25 times is obtained even if using the same capacity motor, and as a result it is possible to effectively use the servomotor 40.

Figure 4:
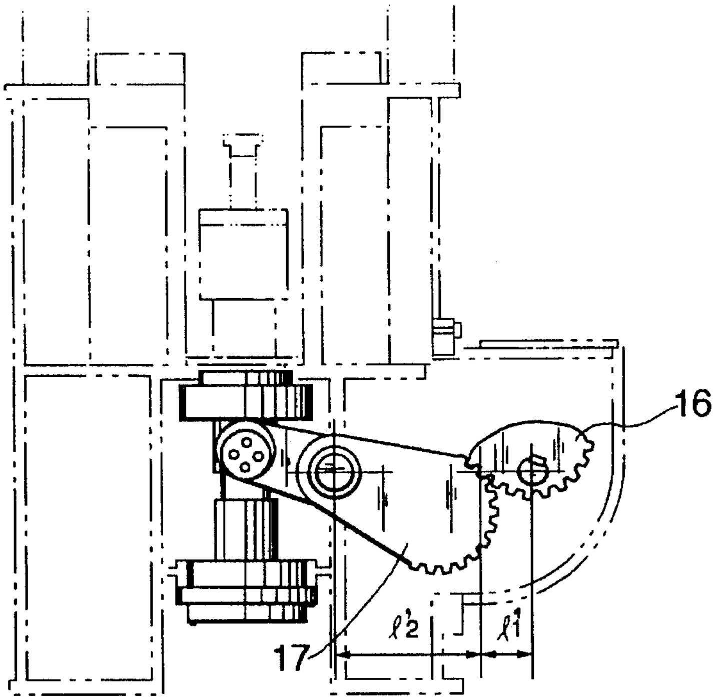
FIG. 4 is a plan view of the pair of non-circular gears shown in FIG. 2, with the velocity of the ram being faster and the output force being smaller at starting point A of the pressing process.
Figure 5:
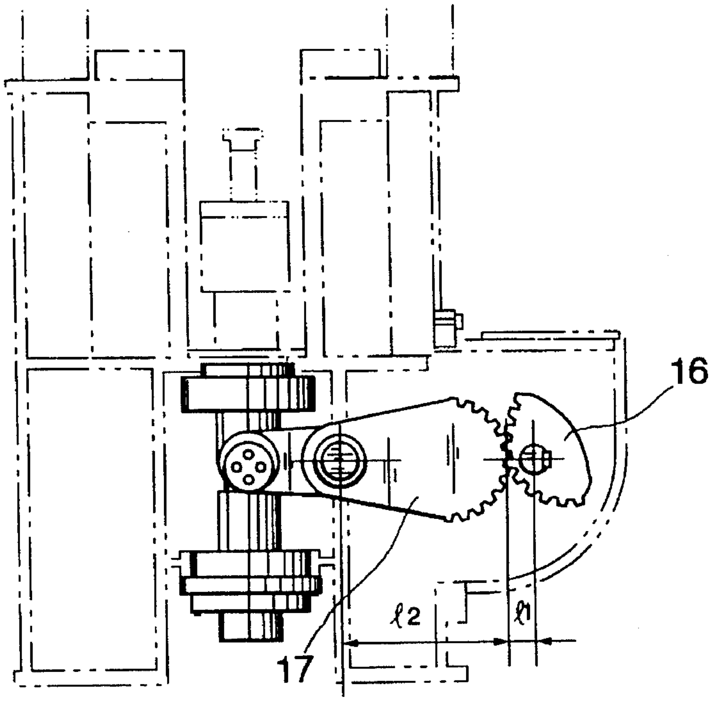
FIG. 5 is a plan view of the essential part explaining the action of a pair of non-circular gears shown in FIG. 2, with the velocity of the ram being slow and the output force being larger at finishing point B of the pressing process.
Figure 6:
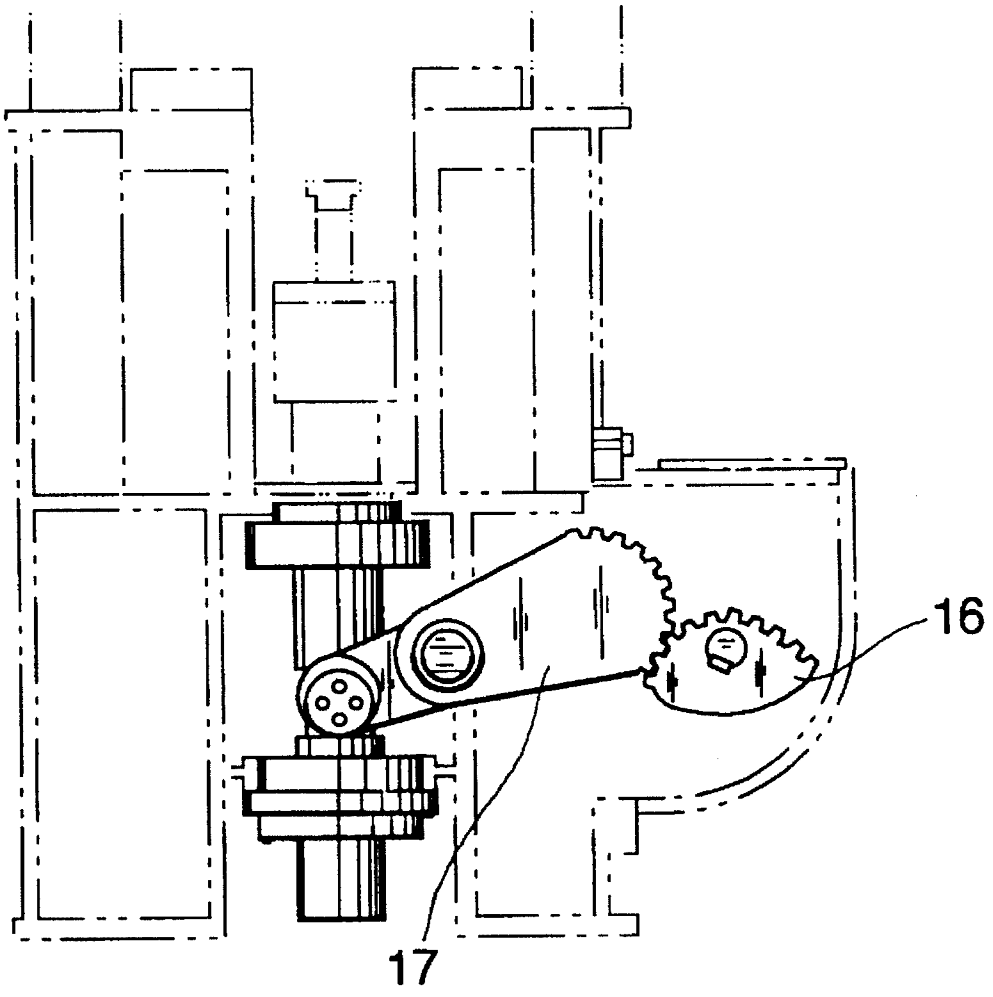
FIG. 6 is a plan view of the essential part explaining the action of a pair of non-circular gears shown in FIG. 2 with the speed of the ram being faster and the output force being lesser at finishing point C of the retracting process.

FIGS. 4, 5 and 6 are plan views showing the condition of the non-circular gear 16 at each position of points A, B and C.

FIG. 4 shows the condition at the compression starting point A, where the pressing velocity is fast and the output force is small.

FIG. 5 shows the condition at the compression end point B (equivalent to the extraction starting point), where the pressing velocity is slow and the output force is larger.

FIG. 6 shows the condition at the extraction end point C, where the speed is accordingly faster and the output force is smaller.

If setting the distance between the swinging center of the swinging lever 17 and the engaging point of the lever 17 to the non-circular gear 16 at the compression starting time to $i'_2$, the distance between the engaging point and the rotating center of the non-circular gear to $i'_1$, and further setting each corresponding distance of the compression end point to $i_2$ and $i_1$, when $(i_1+i'_1)=(i_2+i'_2)$, two equations $i'_1/i_1=1.5$ and $i_2/i'_2=1.5$ are established. As shown in FIG. 4 to FIG. 6, when $(i_1+i'_1)=(i_2+i'_2)$, two equations $i'_1/i_1=1.8$ and $i_2/i'_2=1.25$ are established, and as a result $(i'_1/i_1)\times(i_2/i'_2)=1.8\times1.25=2.25$ is obtained.

Also, in the retracting process, as the highest power is required at point C shown in FIG. 7 when the process begins, then the ram speeds are controlled at low speeds for producing large power. And according to the advancement of the process, the retracting power gradually becomes smaller, and the speed of the ram becomes faster. At point D, the force becomes zero, and the speed is at its highest.

By considering the above-mentioned relation between the force acting on the dies and the compressive speed in the present invention, the profile of the upper ram is divided by the variation of the crank rotating angle ΔQ in the compression stroke, and the amount of the movement of the upper ram between ΔQ variation Δil is evaluated in numerical value extending over the entire stroke. The numerals are then stored in the memory region of the control device 52. Furthermore, in order to drive the lower ram 13 with an arbitrary speed ratio against the upper ram 6, the speed ratio parameter is input arbitrarily by an operator and the previously input numerical data are computed in the control device 52, then the profile of the lower ram 13 under its compressive stroke is prepared by applying the miscellaneous parameters preset by the operator.

By application of the above-mentioned computation, movements of the lower ram 13 are evaluated in numerical values during its one stroke, then the profile is divided by ΔQ, and the moving amount of $\Delta i_2$ of the lower ram 13 is stored in the memory region of the control device 52 as the numerical data extending over the entire stroke, the same as the upper ram 6. In practical operation, output of the encoder 20 installed on the main shaft 2 is always read and compared with the aforementioned data, and the lower ram 13 is driven so that the position of the lower ram 13 in the read angle will coincide with the practical position of the lower ram 13.

Furthermore, in the above embodiment, in controlling the lower ram 13, it is possible to overcome the problem wherein it was impossible simultaneously to satisfy the required conditions of the pressing stroke and retracting stroke, by adopting the non-circular gear 16 together with the crank mechanism. Accordingly, as in the past, when the lower ram driving mechanism combining gears and threads is used, as the gear connected to the lower ram 13 by applying thread mechanism is located in a position having a mechanically high revolution, gear inertia becomes larger, and it was impossible to accurately control the movement of the lower ram in accordance with the upward and downward movements of the upper ram. By adopting the above crank mechanism, however, it becomes possible to solve this inconvenience.

Furthermore, with respect to the inertial characteristic, and as shown in FIGS. 2–3; the speed reducer 43 having a high speed reduction ratio is installed between the motor 40 and the non-circular gear 16, then the high speed rotating parts are capable of being constructed with the less massive parts. It is then possible to drive this system at a high speed, as the swinging lever 17 which is engaged with the non-circular gear 16 is driven at low speed and the inertia is constrained at a small value.

As described above, the powder molding press made according to the present invention is comprised of the rotary encoder which detects the rotational angle of the main shaft, a control device computing the control amount of the lower ram against the rotational angle of the main shaft, and determining the moving amount of the lower ram by applying the data obtained from the computation and the servomotor driving the lower ram under the control of the control device, whereby the rotational force of the servomotor is transmitted to the lower ram after being converted into force and speed which are adequate to perform the pressing work, by the use of the non-circular gears.

It then becomes possible to optionally obtain the required force and speed of the rams, making it possible in a single stroke to solve the problems of high production costs and high operating costs.

What is claimed is:

1. A powder molding press having an external power source for rotating a main shaft therein, comprising;

an encoder for detecting a rotational angle of said main shaft driving directly a first ram and indirectly a second ram;

a control device provided with a memory containing predetermined input numerical data on the movement of said first ram, and containing other input data programmed by an operator of said press, for enabling said second ram to be controlled in accordance with said detected rotational angle of said main shaft and said input data and for determining movements of said second ram by data obtained and/or computed from the control device;

a servo motor driving said second ram under the control of said control device; and a pair of non-circular gears for converting rotational force of said servo motor to a compressive force and to a second ram driving speed for operating said powder molding press; whereby control of said second ram in accordance with movements of said first ram is substantially improved.

2. The powder molding press according to claim 1, further including a speed reducer disposed between said servo motor and said pair of non-circular gears.

3. The powder molding press according to claim 2, wherein said speed reducer is provided with a high speed reduction ratio.

4. The powder molding press according to claim 3, wherein one of said pair of non-circular gears forms a part of a swinging lever with said swinging lever's inertia being constrained.

* * * * *